Dec. 25, 1928.
A. B. PREISSER
1,696,211
VALVE STEM FOR INNER TUBES OF PNEUMATIC TIRES
Filed Aug. 26, 1927
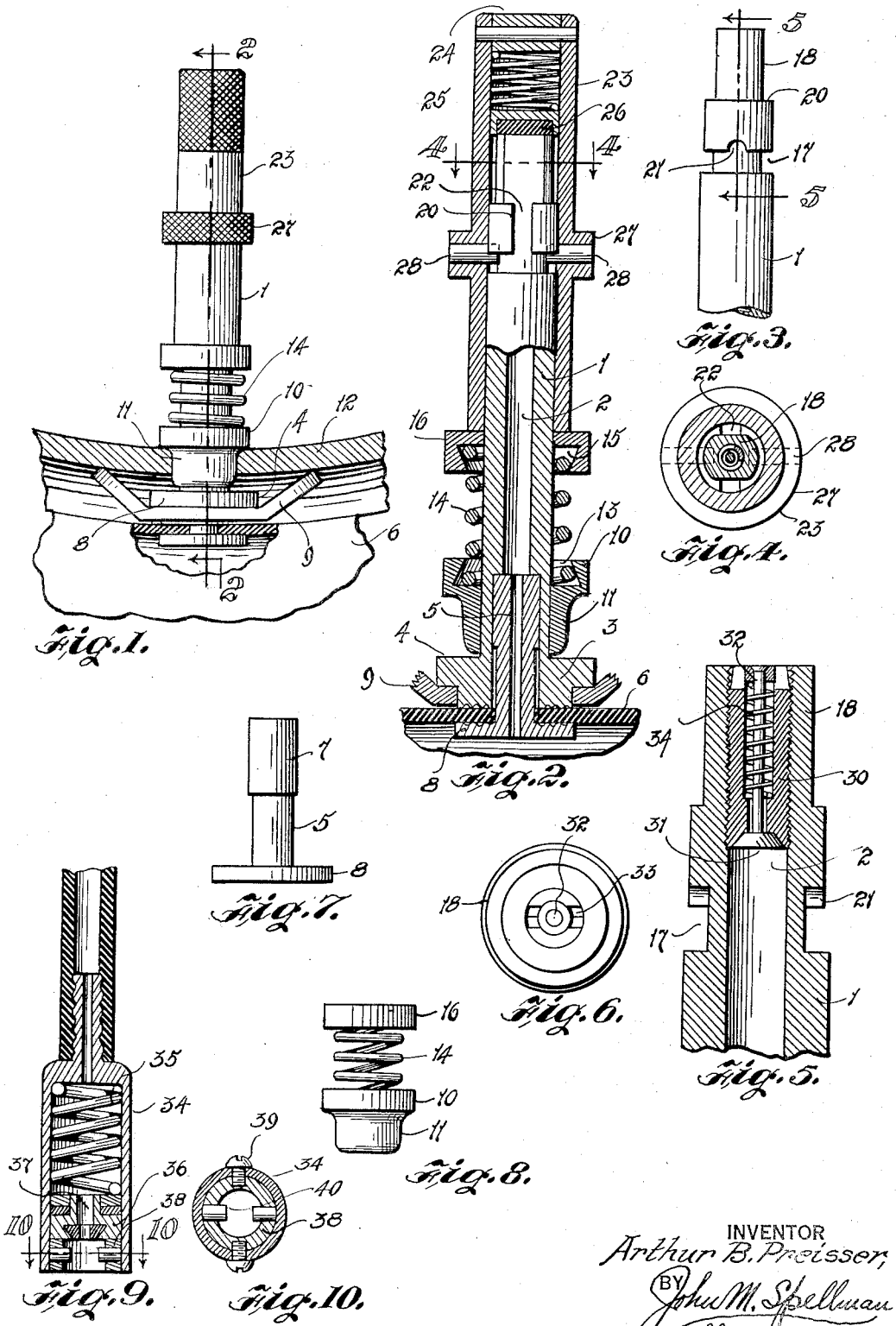
INVENTOR
Arthur B. Preisser,
BY John M. Spellman
ATTORNEY Patented Dec. 25, 1928.

1,696,211

UNITED STATES PATENT OFFICE.

ARTHUR B. PREISSER, OF DALLAS, TEXAS.

VALVE STEM FOR INNER TUBES OF PNEUMATIC TIRES.

Application filed August 26, 1927. Serial No. 215,676.

This invention relates to improvements in valve stems for inner tubes of pneumatic tires.

One particular object of the invention is to eliminate all screw-thread connections such as are in general present use, both in placing and removing the cap on the valve stem in inflating and deflating the inner tube; also eliminating the use of screw-threads in attaching the air hose to the valve stem.

Another particular object of the invention is to provide a new and improved valve core which prevents air leakage.

A further object of the invention is to provide means in its construction and arrangement whereby the valve stem is held flexibly against the rim of the tire and preventing the stem from being torn from the inner tube when stress is put upon the valve stem.

The invention will be clearly understood from a perusal of the following detailed description, taken in connection with the accompanying drawings forming part of this specification, and wherein:

Figure 1 represents a side elevational view of the valve stem, including a cap, and in place upon a motor vehicle rim and tire.

Figure 2 represents a larger view, similar to Figure 1, but in longitudinal cross-section.

Figure 3 is a reduced view of the upper portion of the valve stem, the lower portion being broken away.

Figure 4 is a cross-sectional view along the line 4—4 of Figure 2.

Figure 5 is a partial longitudinal sectional view, enlarged, the view taken along the line 5—5 of Figure 3.

Figure 6 is a top view of the stem as shown in Figure 5.

Figure 7 is a side elevational view of a member for affixing the base of the stem to the inner tube.

Figure 8 represents a spring and its seating elements which permits flexibility of the stem against the rim of the tire.

Figure 9 represents a longitudinal sectional view of a nipple attached to an air hose of a pump, Figure 10 being a cross-sectional view of Figure 9, along the line 10—10 thereof.

Proceeding in accordance with the drawings and wherein different numerals are employed to designate the various parts of the invention, 1 denotes the body of the stem which has a central bore indicated at 2. The stem includes an integral base 3 having a shoulder 4, the bore of the stem being of larger diameter at this point to admit the entrance and reception of a member 5, illustrated in Figure 7, for affixing the base of the stem to the inner tube 6. The member 5 has its upper end enlarged at 7 and forms a part of the stem and when pressed into the bore of the stem proper makes a tight fit thereby forming a perfectly sealed and airtight joint. The member 5 includes a circular base 8 of the same diameter as the bottom of the base 3 and between the base 8 and the base 3 the inner tube is secured. An element 9, common in such connections, is not a part of the invention, being shown merely for the sake of clearness of description.

Seated upon the shoulder 4 of the base 3 is a seat 10 having a rounded lower end 11, the rounded portion being passed through an opening in the tire rim 12. The seat 10 has a dove-tailed recess 13 and in this recess is placed one end of a spring 14, the spring having both ends of a larger diameter than its central part. The upper end of the spring is likewise seated in a dove-tailed recess 15, formed in an upper seat 16, and in this manner the spring is firmly held against displacement. The employment of the spring 14 is to prevent the tearing of the valve stem from the tube when the stem is pulled, and permits flexibility of the stem.

The upper portion of the stem has an annular recess 17 and a head 18 and a cap 19 is provided for closing the stem. An annular shoulder 20 is integrally formed on the upper end of the stem and in the lower edge of the shoulder is formed two small notches 21. The shoulder 20 also includes two longitudinal openings 22. The recess 17, notches 21 and the openings 22 form a means for reception and locking of the cap 23 upon the upper end of the stem. This cap is hollowed and includes a closed upper end 24 against which bears a spring 25, the lower end of the spring being seated upon the valve cover 26. The cap also includes a rounded shoulder or projection 27 in which are seated oppositely disposed pins 28. Now in order to place the cap upon the stem the cap is slipped over the top of the stem and the pins alined with the openings 22. The cap is now pressed downwardly until the pins enter the recess 17, and then the cap is given a quarter turn. This later movement will permit the ends of the pins to be seated in the notches 21, thus tightly locking the cap in position. A reverse quarter turn will of course release the pins from the notches and the spring will expand and draw the cap upwardly for removal. This operation eliminates the use of thread connections and enables the cap to be removed and replaced very quickly.

The stem includes a valve core 30 of the poppet-valve type with a valve 31, stem 32 and a spring 34, the valve seat being ground in the valve core 30. The valve core 30 and the inner walls of the valve stem 1 are screw threaded so that the core can be attached and firmly seated in the stem. This is performed with a screw driver or other tool, the screw driver or tool being placed in the notch 33.

In Figures 9 and 10 are shown a nipple for attaching an air hose to the stem. This is done in the same manner as the cap is secured to the stem. This nipple has a hollow body 34 inside of which is a spring 35. The lower end of the spring is seated normally upon a movable member 36, perforated at 37, and held from displacement in the nipple by a ring 38, the ring being secured to the nipple by the screws 39. In the ring 38 are two oppositely disposed pins 40 which, when the nipple is pressed down upon the head of the stem, pass through the openings 22, and the nipple being given a quarter turn, the pins are seated in the notches 21, the same as when the cap is being placed upon the stem.

Obviously, modifications may be made in the invention, which is not to be understood as restricted to the particular construction here shown.

By means of this construction, quick, easy and accurate adjustment of the parts can be effected, either the cap or the air hose being readily attachable to or detachable from the valve stem or nipple without the necessity of using screw threads therebetween, thus eliminating the slow, laborious movements commonly required today in the operations of inflation and deflation of tires, yet insuring the safe retention of the air within the tire as long as desired.

Also, by means of my construction, the valve stem or nipple, which is held flexibly against the rim of the tire, is prevented from being torn therefrom when stress is put upon the valve stem.

By my invention, a valve is provided which effectually prevents wasteful leakage of air, yet permits of its ready passage therethrough during the desired operations of inflating and deflating the tire.

Also, by my invention, a device is provided which is relatively simple, yet rugged and durable, and positive and efficient in operation.

What is claimed is:

In mechanism adapted to be used with a valve cap for securing a valve stem formed with an enlarged base and a body portion to a tire rim provided with an aperture therethrough, the combination with upper and lower collars slidably fitting around said body portion, of a coiled spring interposed between said collars and having its upper and lower ends of larger diameter than its intermediate portion, the lower end of said upper collar provided with a centrally disposed dovetailed recess therein to detachably receive the enlarged upper end of said spring, the upper end of said lower collar provided with a centrally disposed dovetailed recess therein to detachably receive the enlarged lower end of said spring, said lower collar having its lower end tapered to seat in said tire rim aperture when said spring is compressed by the pressure exerted upon the upper end of said collar by said valve cap in position on said valve stem.

In testimony whereof I affix my signature.

ARTHUR B. PREISSER.